Dec. 13, 1960     A. J. ZABROCKI     2,963,814
MINNOW PAIL
Filed Nov. 6, 1957
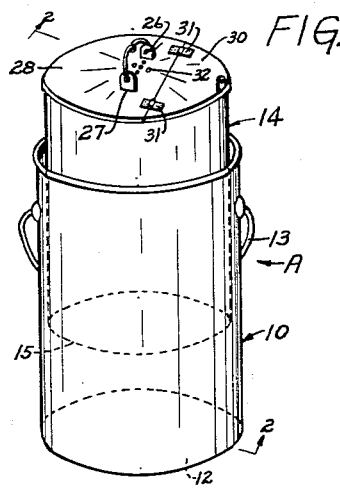
FIG. 1
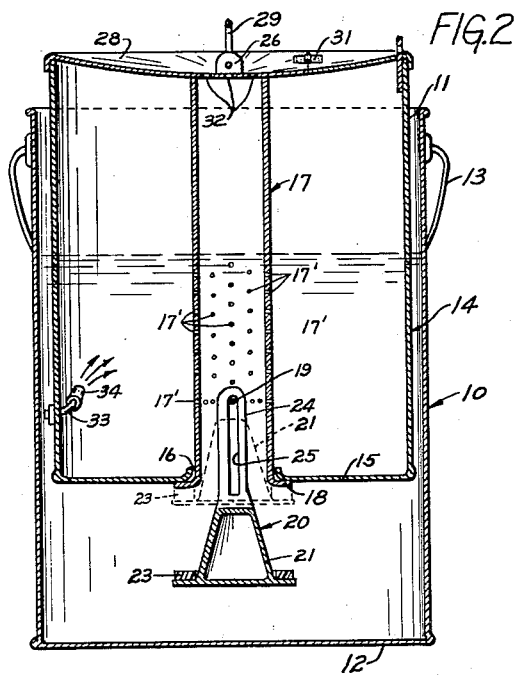
FIG. 2
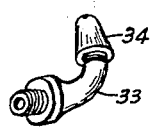
FIG. 3
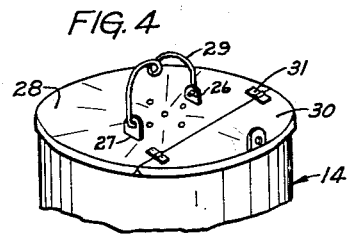
FIG. 4
FIG. 5
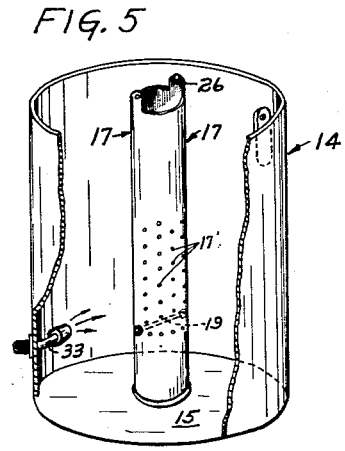
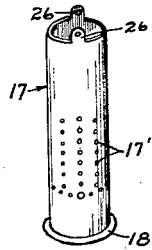
FIG. 6
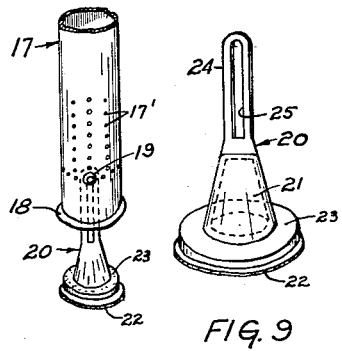
FIG. 7    FIG. 8
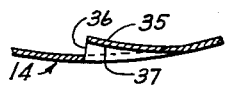
FIG. 10
FIG. 9
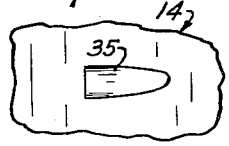
FIG. 11
INVENTOR.
ANTHONY J. ZABROCKI
BY
Jack W. Wicks
ATTORNEY United States Patent Office 2,963,814
Patented Dec. 13, 1960

2,963,814
MINNOW PAIL

Anthony J. Zabrocki, 105 Spruce Place, Minneapolis, Minn., assignor of one-half to Vernon G. Campbell, Winona, Minn.

Filed Nov. 6, 1957, Ser. No. 694,842

4 Claims. (Cl. 43—56)

My invention relates to an improvement in pails and more particularly to a pail in which minnows used for fishing may be kept in healthy, vigorous condition for an extended period of time.

It is an object of my invention to provide a minnow pail which has means for simply but effectively aerating the water in the pail. It is also an object of my invention to provide a minnow pail having means for producing a current throughout the water in the pail by a simple maneuver which aids in keeping the minnows in a healthy condition.

It is a still further object to provide a minnow pail having means for aerating substantially all of the water in the pail simultaneously by a simple single operation. It is an additional object to provide a means whereby the water is aerated and the current provided by a single manipulation. It is also an object to provide a minnow pail, the inner can of which may be removed from the outer can and placed in the water in an inverted position to act as a floating storage container.

I shall not here attempt to set forth and indicate all of the various objects and advantages incident to my invention, but other objects and advantages will be referred to in or else will become apparent from that which follows.

The invention will appear more clearly from the following detailed description when taken in connection with the accompanying drawings, showing by way of example preferred embodiments of the inventive idea.

In the drawings forming part of this application:

Figure 1 is a perspective view of my minnow pail with the inner can member raised partially from the outer pail.

Figure 2 is a longitudinal sectional view substantially on the lines 2—2 of Figure 1 with the float member shown in raised position in broken lines.

Figure 3 is a perspective view of the current producing nipple removed from the inner can.

Figure 4 is a perspective view of the top portion of the inner can.

Figure 5 is a perspective view of the inner can with the top portion and a portion of the side wall removed showing the aerator tube.

Figure 6 is a perspective view of the aerator tube removed from the inner can.

Figure 7 is a perspective view of the aerator tube and the float member depending therefrom.

Figure 8 is an enlarged perspective view of the float member removed from the aerator tube.

Figure 9 is a perspective view of the bolt and nut which mounts the float member.

Figure 10 is a sectional view through a portion of the outer pail wall showing an alternative form of current producing orifice formed therein.

Figure 11 is a front view of the orifice shown in Figure 10.

Referring to the drawings in detail, my minnow pail A includes the outer pail 10 which is open at the upper end 11 and closed at the lower end by means of the bottom member 12. The pail 10 is provided with the bail 13 used to carry the entire unit. Further provided is the inner can or live box 14 having the bottom 15. The bottom 15 has a circular opening 16 formed axially thereof and extending up through which is the aerator tube 17. The aerator tube 17 is cylindrical in formation, and the diameter is substantially that of the opening 16 of the can 10. The tube 17 has formed through the walls thereof the holes 17' to a point 16 of the can 10. Formed on the lower end of the aerator tube 17 is the annular flange 18 which is secured to the underside of the bottom member 15 with the tube 17 extending upwardly and concentrically into the can 14 with the upper end of the tube 17 spaced from the upper edge of the can 14.

The numeral 19 designates a nut equipped bolt which is secured through the tube 17 on the diameter thereof. Further provided is the float member 20 the main body portion of which is in the form of a hollow enclosed truncated cone. The hollow body portion 21 of the float is connected at the bottom thereof to the plate 22 on the outer perimeter of which is mounted the circular gasket 23 which makes a sealing engagement with the underside of the bottom 15 of the inner can 14 when the inner can 14 is submerged in water in the outer pail 10 as will be hereinafter explained. Connected to the top of the float 20 is the link member 24 formed with the elongated slot 25. The bolt 19 is positioned through the slot 25 so that the float 20 may be caused to move up and down and open or close off the lower end of the aerator tube 17, see particularly Figure 2.

The aerator tube 17 is formed with spaced upstanding ear members 26 on the upper end thereof which extend upwardly through spaced slots 27 formed in the partial concave cover portion 28 and are secured thereto by means of the outer ends of the wire handle 29 extended through holes formed in the ears 26. The stationary partial cover portion 28 has hinged thereto the cover portion 30 by means of the hinges 31 thereby completing a full cover for the upper end of the inner can 14 with the portion 30 hingedly mounted. The top portion 28 has formed therethrough the holes 32 which allow drainage from the top into the inner can 14. The cover portions 28 and 30 both form a concave cover, and ice may be placed thereon and allowed to drip through the holes 32 into the inner can, particularly desirable on a hot day.

I further provide the elbow 33 which is secured to the wall of the inner can 14 and which extends through an opening in the wall to form a conduit or orifice connecting the inside of the outer pail 10 to the inside of the inner can 14. The nozzle 34 is mounted on the elbow 33 to control the amount of flow of water through the elbow and into the inner can, and the size of the nozzle determines the rate of flow. A further embodiment of the elbow 33 and nozzle 34 allowing a flow of water from the outer pail into the inner can 14 is found in Figures 10 and 11 where an indent 35 is punched in the wall of the can 14 thereby forming the opening 36. The angular portion 37 of the indent 35 directs water in a circular motion around the aerator tube 14. The size of the opening 36 determines the rate of flow. In the case of the elbow 33, the same is positioned so that the water leaving the same is directed substantially in a circular path paralleling the wall of the inner can 14.

The position of the elbow 33 or the opening 36 whichever the case may be, above the bottom of the can 14, is such that a minimum of water will remain for the minnows in the bottom of the inner can when the same is moved upwardly in the outer pail 10.

In using my minnow pail A, the outer pail 10 is filled approximately three-fourths full with water. The inner can 14 is then placed in the outer pail and when half full the minnows are put in the inner can and the inner can allowed to float again and gradually sink to the bottom of the pail 10. As the inner can 14 is caused to move downwardly in the water in the outer pail, the float 20 rises and closes the lower end of the tube 17 by means of the gasket 23. Water is forced through the elbow 33 and out the nozzle 34 in the direction of the arrows in Figures 2 and 5 and into the inner can thereby causing a circular current within the inner can 14. The current produced within the inner can 14 simulates that in a stream or creek, and it is, of course, endless about the aerator tube 17.

The circular current produced in the can 14 by a single downward movement of the can 14 continues for a time due to the momentum of the water, and the current may be renewed or continued by a further or continued downward moving of the can 14 within the pail 10. The current produced keep the minnows swimming in one direction which is against the current and this coupled with the central tube 17 keeps the minnows from colliding with each other thus increasing their life span.

As the inner can 14 is raised within the pail 10, the float 20 drops thus opening the lower end of the aerator tube 17 and water runs out the holes 17' of the tube 17 downwardly through the tube into the pail 10. Such transfer and action of the water aerates the same to give longer life to the minnows.

The rate of current created in the inner can 14 is determined by the size of the orifice of the nozzle 34; the larger the hole in the nozzle the stronger the current and the smaller the hole the weaker the current produced.

The orifice or transfer passage formed by the elbow 33 in the wall of the inner can 14 may be in the form of a punched indent 35 forming the opening 36 the size of which is formed according to the amount of current flow desired.

It will thus be seen that by a single up and down movement of the inner can 17, the water is aerated and a current produced within the can 17 producing the desirable results hereinbefore mentioned.

The invention is not to be understood as restricted to the details set forth since these may be modified within the scope of the appended claims without departing from the spirit and scope of the invention.

Having thus described the invention, what I claim as new and desire to secure by Letters Patent is:

1. A minnow pail adapted to keep minnows fresh by intermittent charging with air and movement of the water therein consisting of an outer cylindrical container, an inner cylindrical container telescopically received in said outer container, an elongated central hollow member in said inner container communicating at the lower end thereof with said outer container, said hollow member having apertured side walls for allowing the passage of water therethrough and into said outer container, a sealing member slidable within said hollow member adapted to permit the flow of water from said inner container to said outer container when said inner container is moved upwardly with respect to said outer container and adapted to prevent the flow of water from said inner container to said outer container when said inner container is moved downwardly with respect to said outer container, and means on said inner container for releasing water circumferentially into said inner container from said outer container when said inner container is lowered into said outer container whereby a circumferential current about said hollow member is created.

2. The device of claim 1 wherein said hollow member is equipped at the upper end thereof with handle engaging lugs, and wherein a cover for said inner member having cooperative recesses adapted to receive said lug is provided.

3. A minnow pail consisting of an outer cylindrical container, an inner cylindrical container of lesser diameter than said outer container, and telescopically nested in said outer container, said inner container having a central aperture in the bottom thereof, a perforated cover attached to said inner container, a central hollow perforated tube extending from said cover through the central aperture in the bottom of said inner container to provide a central vertical passageway between the annular minnow carrying space thereby defined in said inner container and said outer container, buoyant sealing means vertically movable within said tube for draining said annular minnow carrying space when said inner container is lifted out of said outer container and for sealing off said minnow carrying space when said inner container is lowered into said outer container, and means circumferentially positioned on said inner container for permitting the re-entrant flow of water from said outer container into the annular minnow carrying space of said inner container whereby to create a tangential flow of water about said tube.

4. The device of claim 3 wherein said buoyant sealing means consists of an elongated neck portion slidably engageable with said tube and a substantially conical bottom adapted to sealably engage the aperture in the bottom of said inner container.

References Cited in the file of this patent
UNITED STATES PATENTS

| | | |
|---|---|---|
| 2,244,457 | Hartford | June 3, 1941 |
| 2,303,757 | Pierson | Dec. 1, 1942 |
| 2,575,636 | Patch | Nov. 21, 1951 |
| 2,902,700 | Chambers | Sept. 8, 1959 |